(12) United States Patent
McBride et al.

(10) Patent No.: US 9,430,162 B1
(45) Date of Patent: Aug. 30, 2016

(54) METADATA-BASED BYPASSING IN A CONTROLLER

(71) Applicant: INTERNATIONAL BUSINESS MACHINES CORPORATION, Armonk, NY (US)

(72) Inventors: Gregory E. McBride, Vail, AZ (US); David C. Reed, Tucson, AZ (US); Michael R. Scott, Ocean View, HI (US); Richard A. Welp, Manchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/956,329

(22) Filed: Dec. 1, 2015

(51) Int. Cl.
*G06F 13/00* (2006.01)
*G06F 3/06* (2006.01)
*G06F 11/20* (2006.01)
*G06F 11/14* (2006.01)

(52) U.S. Cl.
CPC ............ *G06F 3/065* (2013.01); *G06F 3/0619* (2013.01); *G06F 3/0647* (2013.01); *G06F 3/0683* (2013.01); *G06F 11/1451* (2013.01); *G06F 11/201* (2013.01)

(58) Field of Classification Search
CPC .... G06F 3/065; G06F 3/0619; G06F 3/0647; G06F 3/0683; G06F 11/1451; G06F 11/201
USPC .......................................... 711/161, 162, 170
See application file for complete search history.

(56) References Cited

U.S. PATENT DOCUMENTS

| 5,659,743 | A | 8/1997 | Adams et al. |
| 5,809,542 | A | 9/1998 | Tsuboi et al. |
| 6,829,688 | B2 | 12/2004 | Grubbs et al. |
| 8,527,467 | B2 | 9/2013 | Shmueli |
| 8,560,759 | B1 | 10/2013 | Boyle et al. |
| 8,560,801 | B1 | 10/2013 | Pendharkar et al. |
| 8,954,702 | B2 | 2/2015 | Bohling et al. |
| 2007/0113157 | A1 | 5/2007 | Perego |
| 2010/0199058 | A1 | 8/2010 | Szowa et al. |

(Continued)

OTHER PUBLICATIONS

English et al., "Loge: a self-organizing disk controller." Proceedings of the Winter 1992 USENIX Conference. 1992, pp. 15.

(Continued)

*Primary Examiner* — Hong Kim
(74) *Attorney, Agent, or Firm* — William K. Konrad; Konrad Raynes Davda & Victor LLP

(57) ABSTRACT

Provided are a computer program product, system, and method for data unit classification in accordance with one embodiment of the present description, in which in response to a data processing command, a storage controller classifies data units of a storage unit as either allocated to a data set or as unallocated to any data set. If allocated to a data set, the storage controller can further classify data set-allocated data units as either containing client data or metadata or as empty. In accordance with one aspect of the present description, the storage controller may bypass data processing of the data units which have not been allocated to any data set or otherwise do not contain client data or metadata. Other aspects of data unit classification in accordance with the present description are described.

21 Claims, 6 Drawing Sheets

(56) References Cited

U.S. PATENT DOCUMENTS

| | | | |
|---|---|---|---|
| 2014/0244937 A1 | 8/2014 | Bloomstein et al. | |
| 2014/0281123 A1* | 9/2014 | Weber | G06F 12/0246 711/103 |
| 2016/0016579 A1* | 1/2016 | Naqi | G60K 6/445 477/3 |
| 2016/0026575 A1* | 1/2016 | Samanta | G06F 12/0888 711/103 |

OTHER PUBLICATIONS

C. Taylor, "Effective Backups: Selecting the Right Backup Mechanism to Match the Business Requirement", IBM Corporation, 2014, pp. 62.

U.S. Appl. No. 14/834,303, filed Aug. 24, 2015 by inventors T.T. Harris, Jr., G.E. McBride, D.C. Reed, M.R. Scott, and R.A. Welp.

* cited by examiner

METADATA-BASED BYPASSING IN A CONTROLLER

BACKGROUND OF THE INVENTION

1. Field of the Invention

The present invention relates to a computer program product, system, and method for data processing data units of a data storage unit.

2. Description of the Related Art

In certain computing environments, multiple host systems may configure groups of data often referred to as "data sets" in storage volumes configured in a storage system, such as interconnected storage devices, e.g., a Direct Access Storage Device (DASD), Redundant Array of Independent Disks (RAID), Just a Bunch of Disks (JBOD), etc., which are typically controlled by a storage controller coupled to the hosts and storage devices. Data sets which may contain a file or many files, are typically comprised of data units often referred to as "extents," which typically may comprise data stored in groupings of smaller data units often referred to as "tracks." The Z/OS® operating system from International Business Machines Corporation ("IBM") has a Volume Table of Contents (VTOC) to provide to a host, information on data sets of extents configured in the volume, where the VTOC indicates to the host, the location of tracks, extents, and data sets for a volume in storage.

Various data processing tasks are frequently performed at a storage volume level. For example, to avoid loss of data, data stored on a volume (often referred to as a primary volume) may be backed up by copying it to another volume (often referred to as a secondary volume) frequently stored at another geographical location. Accordingly, in the event that data on the primary volume is lost due to data corruption, hardware or software failure, or a disaster which destroys or damages the primary volume, the backup data may be retrieved from the secondary volume.

In a typical volume level copying operation by a storage controller, all tracks allocated to the volume are copied, whether or not the tracks contain client data or metadata. In many storage systems, hosts have access to metadata stored in a VTOC identifying which tracks of a volume have been allocated to data sets and which tracks of a data set contain client data or metadata. Using host software, some analysis may be done to avoid copying unallocated areas of a volume or unused areas of a non-VSAM (Virtual Storage Access Method) data set. However, such VTOC metadata has typically not been readily accessible to the storage controller. Moreover, for VSAM data sets, both used and unused areas within the data set are typically moved by the host software.

SUMMARY

Provided are a computer program product, system, and method for, in one aspect of the present description, data unit classification for selective data processing by a storage controller. In one embodiment, in response to receipt of a command to perform data processing of data stored within a storage unit, such as a storage volume, for example, which is controlled by the storage controller, metadata is read by the storage controller from a storage unit data structure, and based upon read metadata, data units of the storage unit are classified as data set-allocated to one or more data sets, or are classified as unallocated to any data set. In one aspect of the present description, data processing is performed upon data of at least a portion of the data units classified as data set-allocated data units of the storage unit, whereas data processing of data units classified as unallocated data units, is bypassed.

In another aspect, based upon read metadata, data set-allocated data units are classified as data containing data set-allocated data units, or are classified as empty data set-allocated data units. Data processing is performed on data contained by data containing data set-allocated data units of the storage unit whereas data processing of the empty data set-allocated data units is bypassed. Other aspects of data unit classification in accordance with the present description are described.

BRIEF DESCRIPTION OF THE DRAWINGS

FIG. 5 illustrates an example of a map of data extents of a storage volume classified in accordance with one aspect of the present description.

FIG. 6a illustrates an example of data extents of a storage volume classified in accordance with another aspect of the present description.

FIG. 6b illustrates an example of data tracks of a storage volume classified in accordance with as aspect of the present description.

DETAILED DESCRIPTION

Figure 1A:
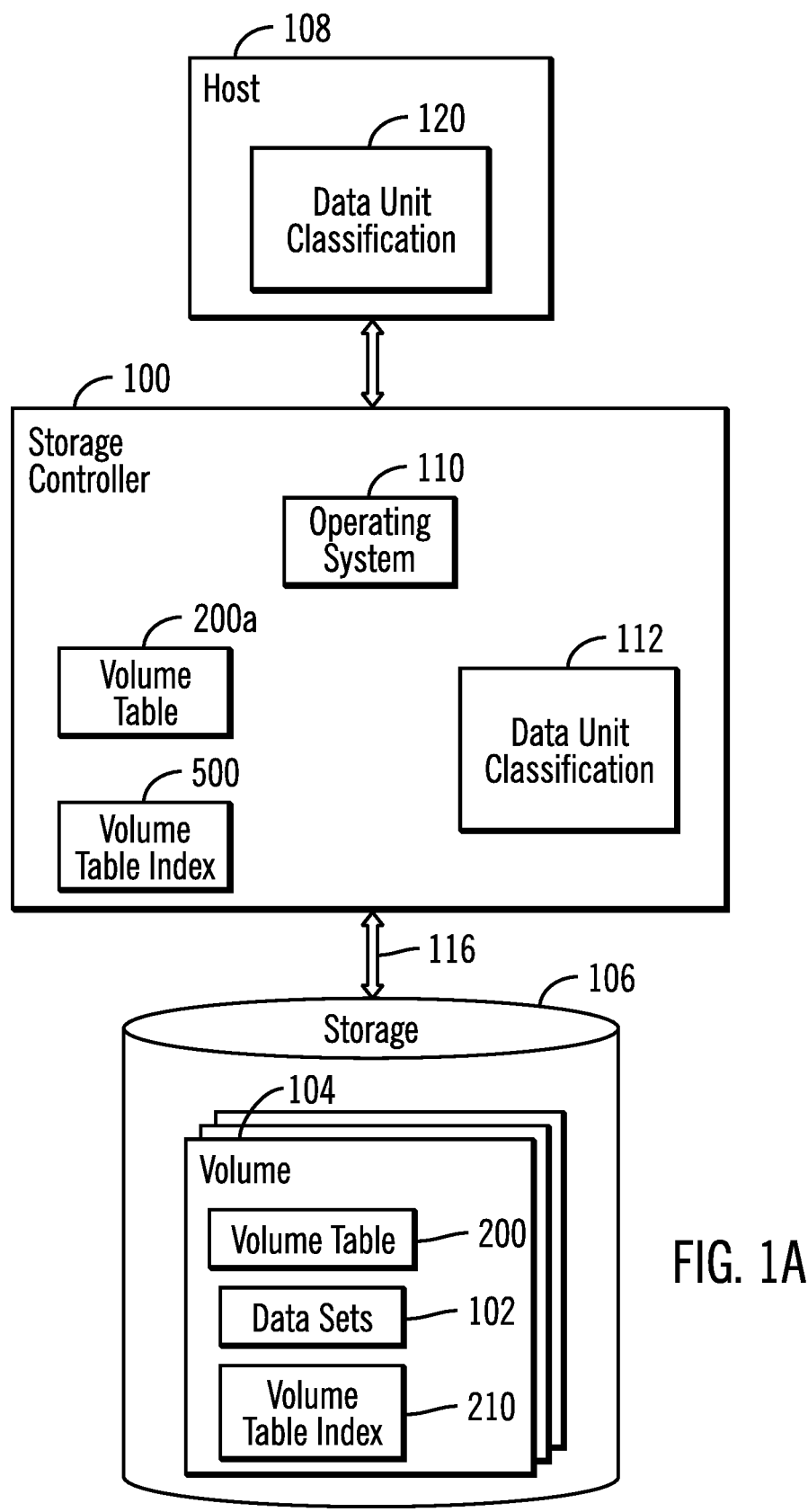
FIG. 1A illustrates an embodiment of a storage environment, employing aspects of data unit classification in accordance with the present description.

A storage unit such as a storage volume may be subdivided into storage subunits, also referred to herein as data units, such as tracks or extents, for example. Described embodiments provide techniques for facilitating data processing performance in which a storage controller, in response to a volume level data processing command, for example, classifies data units such as extents or tracks as either allocated to a data set (hereinafter referred to as "data set-allocated data units") or as unallocated to any data set. In accordance with one aspect of the present description, the storage controller may bypass data processing of the data units which have not been allocated to any data set since the unallocated data units of the volume do not contain client data or metadata.

In another aspect of the present description, the storage controller can further classify data set-allocated storage units which have been allocated to a data set of the volume, as either containing client data or metadata or as empty. Any empty data set-allocated data units may similarly be bypassed notwithstanding that the data units have been allocated to data set because the empty data set-allocated data units do not contain client data or metadata. Conversely, any data set-allocated data unit classified as containing client data or metadata may be processed in accordance with the volume level data processing command.

Thus, upon receipt of, for example, a volume level copy command to copy a storage volume, the data units allocated to data sets and actually containing client data or metadata may be copied to another volume. Conversely, copying operations for unallocated data units or data set-allocated data units which are empty, may be bypassed to increase the speed or efficiency at which the volume level copying command is performed. In this manner, data units of a storage unit such as a storage volume may be classified as suitable candidates for volume level data processing while other data units of the same storage volume are classified as suitable candidates for being bypassed to increase data processing efficiency notwithstanding that the candidates for data processing and the candidates for being bypassed may be intermixed within a single storage volume.

The illustrated embodiment is described in connection with a data processing command which copies data units from one storage unit such as a storage volume to another storage volume. For example the data processing command may be an instant copy operation performed by the storage controller. An example of such an instant copy command is an IBM FlashCopy® command modified by data unit classification in accordance with the present description. However, it is appreciated that data unit classification in accordance with the present description may be applied to other types of data processing such as moving, migrating, mirroring, synchronizing or resynchronizing data of one storage unit with respect to another storage unit of the storage system.

Metadata describing the data stored within a storage unit such as a storage volume, may be stored in a storage unit data structure such as, for example, a Volume Table of Contents (VTOC) which is typically stored in the storage volume itself. Previously, the VTOC metadata was formatted in a manner suitable for the host to read the VTOC and obtain the metadata stored in the VTOC. In one aspect of the present invention, a storage unit data structure such as a Volume Table of Contents (VTOC) stored in the storage volume may be formatted to be read by the storage controller as well as the host, to facilitate data unit classification for storage unit level commands such as volume level commands, for example. As a result, in one embodiment, the data processing candidate classification and the bypass candidate classification of data units such as extents or tracks stored in a particular storage unit such as a storage volume, as described herein, may be undertaken by the storage controller. It is appreciated that in other embodiments, the data processing and bypass candidate classification of groups of data such as data units as described herein may be undertaken by the host, or a combination of both the storage controller and the host, for example, depending upon the particular application. Accordingly, one or both of the host and the storage controller may have logic configured to read the VTOC of a storage volume and obtain appropriate metadata for data processing and bypass candidate classification.

Once suitable data unit candidates for volume level data processing have been identified, the client data or metadata of each suitable candidate may be located and processed in accordance with the data processing command. In many storage controllers, the data of a data set is stored in data extents, each of which may be located in different available storage spaces. As a consequence, the data of a single data set may be dispersed over several different storage units such as storage volumes. In accordance with the present description, each storage volume of a multivolume data set has metadata identifying the location of the extents of each data set located within the particular volume, as well as metadata identifying an open/closed status indicating whether the associated data set is open for input/output operations or is closed for input/output operations. In one aspect of the present description, data processing of extents of a data set which is still open for input/output operations is deferred until the data set is closed to ensure that all data of the data set is processed.

Previously, the location of each extent of a data set stored in a storage volume was identified in metadata of the VTOC which was formatted in a manner to be understandable only to logic of the host. In accordance with another aspect of the present description, in one embodiment, the storage controller may also include logic configured to obtain and process the extent location metadata from the VTOC for each data unit found to be a suitable candidate for data processing. As a result, the storage controller may be configured to read and understand both the extent location metadata and the open/closed status metadata information for each data set having data stored in the storage volume.

Still further, the storage controller may be configured to read and understand metadata identifying a boundary in a data set, in which the boundary indicates the end of the data units of the data set containing data, and the beginning of the data units of the data set which are empty. In addition, the storage controller may be configured to read and understand the metadata identifying the locations of the extents which have not been allocated to any data set.

Based upon the read metadata, the storage controller is configured to identify the data units allocated to data sets and which actually contain client data or metadata and to identify unallocated data units or data set-allocated data units which are empty. Thus, upon receipt of, for example, a volume level copy command to copy a storage volume, the data units allocated to data sets and actually containing client data or metadata may be copied by the storage controller to another volume. Conversely, copying operations for unallocated data units or data set-allocated data units which are empty, may be bypassed by the storage controller to increase the speed or efficiency at which the volume level copying command is performed. It is appreciated that in other embodiments, other features and advantages may be realized, in addition to, or instead of those described herein, depending upon the particular application.

In one embodiment, a storage unit such as a storage volume, may store data in subunits of storage which are referred to herein as data units or storage subunits. Examples of data units or storage subunits include storage allocation units, cylinders, tracks, extents, gigabytes, megabytes, etc. the relative sizes of which may vary. For example, a storage allocation unit is typically on the order of 16 megabytes in size or 21 cylinders in size, depending upon the appropriate unit of measure.

As previously mentioned, a data set may comprise many data extents, each data extent being stored in a particular storage unit such as a storage volume. A data extent of a data set typically comprises data stored in a plurality of data units or storage subunits such as tracks which are typically physically located in physically contiguous storage areas of the storage unit. Thus, in the context of storage volumes, each data extent of a data set typically comprises data stored in a plurality of physically contiguous tracks of a particular storage volume. It is appreciated that the size of each storage subunit or data unit may vary, depending upon the particular application. A storage controller typically processes data in groups of data in integral multiples of storage allocation units such that the smallest increment of data being processed is typically no smaller than a single storage allocation unit. It is appreciated that data may be processed in various sizes of data units such as tracks, cylinders, megabytes, gigabytes, data extents, allocation units, etc.

In some embodiments, the storage unit such as a storage volume, may be a virtual storage volume having a plurality of virtual data units or storage subunits of a storage unit. One example of a virtual data unit is a virtual storage allocation unit. Each virtual storage allocation unit is mapped by the storage controller to an actual physical storage allocation unit in a particular storage performance tier. The mapping of each virtual allocation unit of each data extent stored in a virtual storage volume, is typically contained within the metadata for that data set in the VTOC data structure of the particular virtual storage volume.

FIG. 1A illustrates an embodiment of a computing environment including a storage control unit, such as a storage controller 100 or server, that manages access to data sets 102 configured in storage volumes 104 in a storage 106 by one or more hosts as represented by a host 108 (FIG. 1A). The storage controller 100 may be a primary storage controller 100a (FIG. 1B) for a primary storage 106a similar to the storage 106 (FIG. 1A), or may be a secondary storage controller 100b for a secondary storage 106b similar to the storage 106 (FIG. 1A). The storage volumes 104 (FIG. 1A) of the storage devices 106a, 106b (FIG. 1A) may be in a peer-to-peer mirror relationship such that data written to one storage volume, typically a primary storage volume in the primary storage 106a, is mirrored to a corresponding secondary storage volume in the secondary storage 106b such that the secondary storage volume is a copy of the primary storage volume. The source of the data written to the storage volumes is typically one or more of the hosts 108. Thus, the hosts 108 issue input/output requests to a storage controller 100 requesting the storage controller 100 to read data from or write data to the storage volumes 104 of the storage 106 controlled by the storage controller 100. It is appreciated that data unit classification in accordance with the present description is applicable to other types of storage units in addition to storage volumes in a mirrored, peer-to-peer relationship.

A data set 102 (FIG. 1A) comprises a collection of data intended to be stored in a logical allocation of data, such as data from a single application, user, enterprise, etc. A data set 102 may be comprised of separate files or records, or comprise a single file or record. Each record or file in the data set 102 may be comprised of data extents of data.

The storage controller 100 includes an operating system 110 and data unit classification control logic 112 to manage the storage of data sets 102 in the storage volumes 104 in accordance with the present description. The operating system 110 may comprise the IBM z/OS® operating system or other operating systems for managing data sets in storage volumes or other logical data structures. (IBM and z/OS are trademarks of IBM worldwide). The data unit classification control logic 112 may be separate from the operating system 110 or may be included within the operating system. The data unit classification control logic may be implemented with hardware, software, firmware or any combination thereof.

It is appreciated that some or all of data unit classification control functions in accordance with the present description may be implemented in one or more of the hosts 108 as represented by the data unit classification control logic 120 of the host 108. Here too, the data unit classification control logic 120 may be separate from the operating system of the host or may be included within the host operating system. The data unit classification control logic 120 may be implemented with hardware, software, firmware or any combination thereof.

Each storage volume 104 includes metadata concerning the data sets 102 stored in one or more storage unit data structures of each storage volume 104 such as a storage volume table 200 having information on the storage volume 104 to which it pertains, including open/closed status metadata, and extent location metadata for each data set 102 having data stored in the particular storage volume 104. The open/closed status metadata may be used to classify the status of each data set as currently open for input/output operations, or currently closed to input/output operations active or inactive. The extent location metadata may be used identify the data extents of each data set 102, and to locate the physical storage locations of each data extent of the data sets 102 having data stored in the particular storage volume 104.

The storage volume table 200 may be stored in the storage volume 104, such as in the first few records of the storage volume, i.e., starting at the first track in the storage volume 104. In IBM z/OS operating system implementations, the storage volume table 200 may comprise a storage volume table of contents (VTOC). In other embodiments, the storage volume metadata may include a Virtual Storage Access Method (VSAM) Volume Data Set (VVDS). In one embodiment, the storage volume tables 200 may comprise contiguous space data sets having contiguous tracks or physical addresses in the storage 106. In alternative embodiments, the storage volume table 200 may comprise a file allocation table stored separately from the storage volume 104 or within the storage volume 104. It is appreciated that storage volume metadata may include metadata in other formats describing various aspects of the data sets 102 of the storage volume.

The storage controller 100 may maintain copies of the storage volume tables 200 to use to manage the data sets 102 in the storage volumes 104. In z/OS implementations, the storage volume table 200, e.g., VTOC, may include extent location metadata describing locations of data sets in the storage volume 104, such as a mapping of tracks in the data sets to physical storage locations in the storage volume. In some embodiments, the storage volume metadata may include open/closed status metadata fields containing data indicating whether the data set is currently open for input/output operations or is closed. In some embodiments, the storage volume table 200 may comprise other types of file allocation data structures that provide a mapping of data to storage locations, either logical, virtual and/or physical storage locations. In this way, the storage volume table 200 provides a mapping of tracks to data sets 102 in the storage volume 104. In further embodiments, the storage volume table 200 may include metadata such as a storage volume name and data set records indicating data sets having data extents configured in the storage volume 104. Each data set record may have information for each data set 102 in a storage volume 104, including the data units (e.g., tracks, blocks, etc.) assigned to the data set 102. Tracks may be stored in data extents, which provide a mapping or grouping of tracks in the storage volume 104. The storage volume 104 may further include a storage volume table index 210 that maps data set names to data set records in the storage volume table 200. In one embodiment, the metadata may include a mapping of the data extents of each data set 102 (or data set portion) stored within the storage volume 104, to physical allocation units which may be identified by cylinder and/or track numbers, for example.

The storage 106 may comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

Figure 1B:
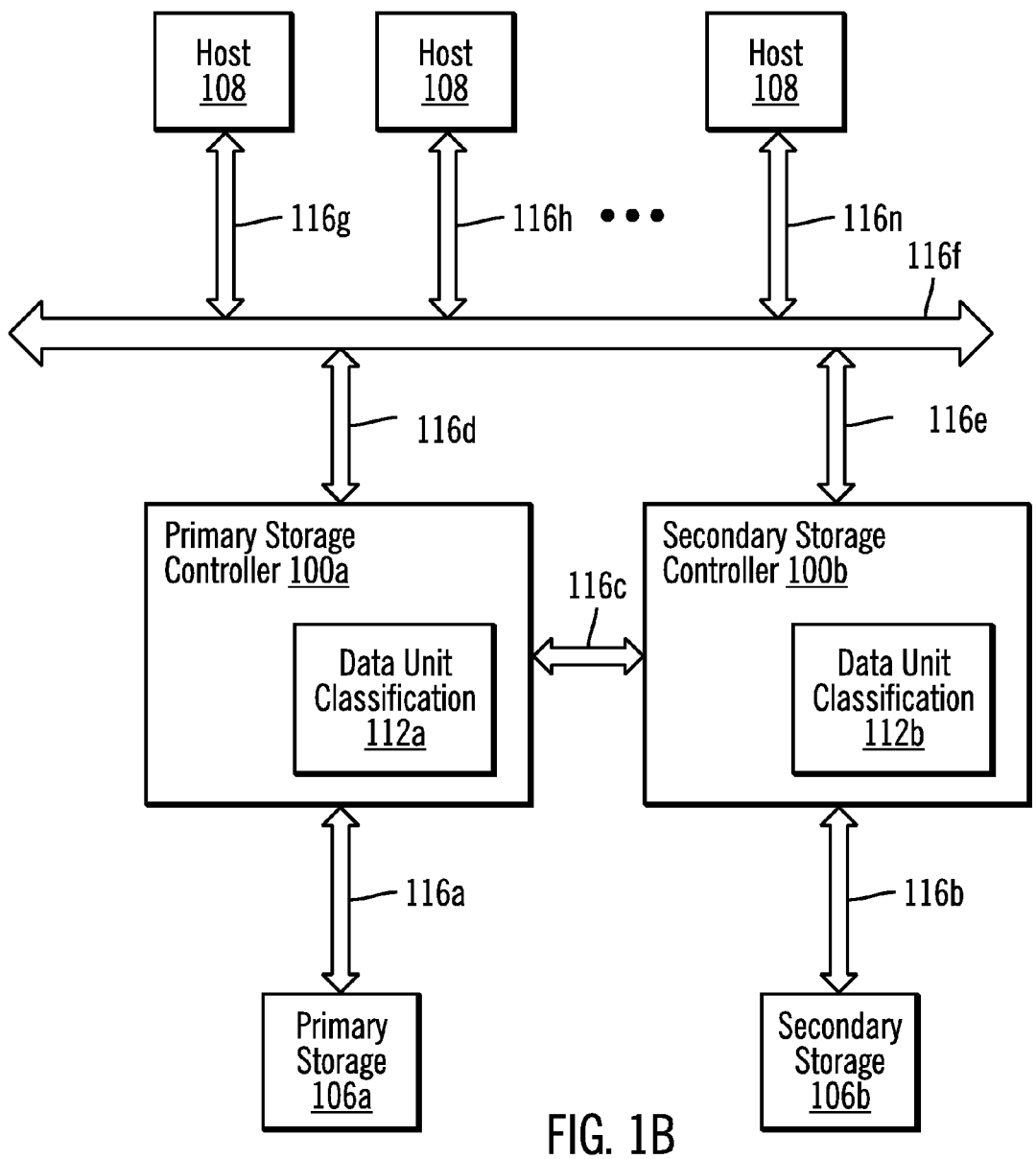
FIG. 1B illustrates another embodiment of a storage environment, employing aspects of data unit classification in accordance with the present description.

The storage controller 100 communicates with the storage 106 via connection 116. The components of the embodiment depicted in FIG. 1B are similarly interconnected by connections 116a, 116 b . . . 116n. The connections 116, 116a, 116b . . . 116n each may comprise one or more networks, such as a Local Area Network (LAN), Storage Area Network (SAN), Wide Area Network (WAN), peer-to-peer network, wireless network, etc. Alternatively, the connections 116, 116a, 116b . . . 116n may comprise bus interfaces, such as a Peripheral Component Interconnect (PCI) bus or serial interface.

Figure 2:
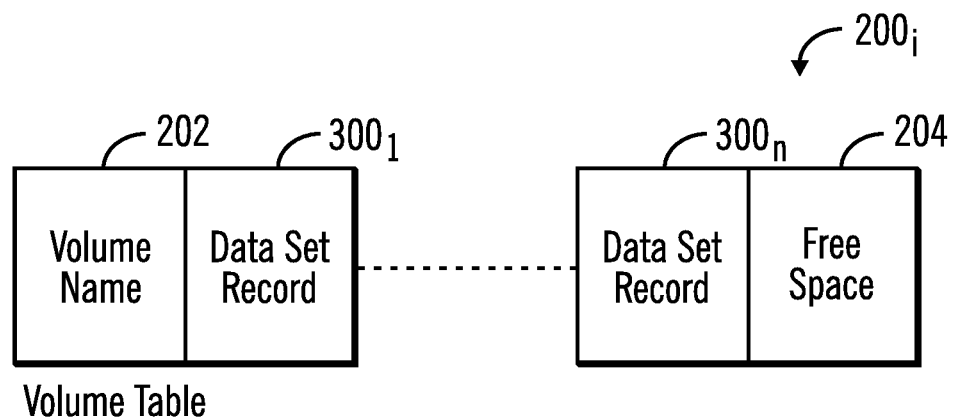
FIG. 2 illustrates an embodiment of a volume table.

FIG. 2 illustrates an example of an arrangement of information maintained in a storage unit data structure such as an instance of a storage volume table $200_i$ for one storage volume $104_i$. It is appreciated that metadata for a storage unit in accordance with the present description may have other arrangements, depending upon the particular application.

The storage volume table instance $200_i$ of this example includes a storage volume name 202, also known as a storage volume serial number, e.g., a VOLSER, that provides a unique identifier of the storage volume. The storage volume name 202 may be included in the name of the storage volume table $200_i$ in the storage volume 104. The storage volume table $200_i$ instance further includes one or more data set records $300_1$ . . . $300_n$ indicating data sets having data extents of tracks configured in the storage volume $104_i$ represented by the storage volume table 200. In embodiments where the operating system 110 comprises operating systems such as the Z/OS operating system, the data set records may comprise data set control blocks.

The storage volume table $200_i$ further includes one or more free space records 204 identifying ranges of available tracks in the storage volume $200_i$ in which additional data set records $300_{n+1}$ can be configured, or may be allocated to data sets. Thus, the tracks identified by the free space records 204 have not yet been allocated to a data set for client data or a data set for metadata, and therefore may be classified as unallocated. In accordance with the present description, these unallocated tracks may be bypassed by the storage controller in performing a volume level data processing command and thus need not be processed in response to the volume level data processing command since the unallocated tracks do not contain client data or metadata.

Figure 3:
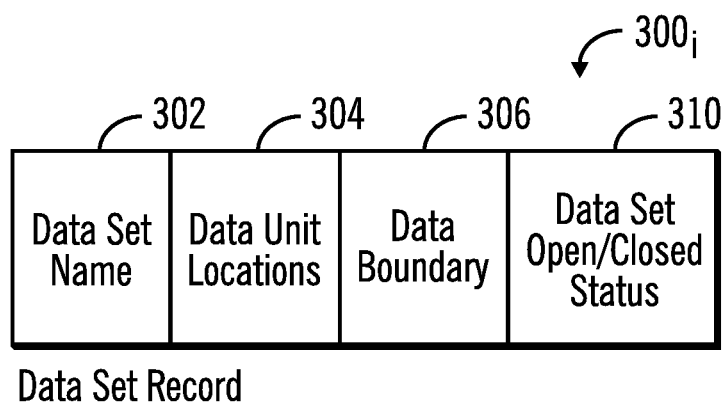
FIG. 3 illustrates an embodiment of a data set record.

FIG. 3 illustrates an example of an instance of a data set record $300_i$, such as one of the data set records $300_1$ . . . $300_n$ included in the storage volume table $200_i$. Each data set record $300_i$ contains metadata 302, 304, 306, 310 pertaining to a particular data set 102 (FIG. 1A). In one embodiment, the metadata may be arranged in fields including for example, a field 302 identifying a name for the particular data set, one or more fields 304 identifying the locations of data units such as tracks, extents or storage allocation units, for example, which have been allocated to the data set of the record $300_i$, one or more fields 306 identifying a data boundary address of the data unit which borders between data units of the data set containing client data or metadata, and data units of the data set which are empty, that is, do not contain client data or metadata. In addition, one or more fields 310 indicate whether the data set of the record $300_i$ is currently open for access by input/output operations, or is currently closed for input/output operations.

Thus, in one embodiment, the allocation of data units such as tracks or extents to a data set having data stored within a particular volume is described within the VTOC on each volume. In one embodiment, the VTOC contains Format1/Format3 Data Set Control Block (DSCB) chains that describe the extents on the volume that a data set resides within.

As previously mentioned in some embodiments, the storage volume metadata may include a Virtual Storage Access Method (VSAM) Volume Data Set (VVDS). In some non-VSAM embodiments, a field within the aforementioned control blocks, such as the DS1IND80 field, for example, may be used by the storage controller to determine whether the particular storage volume is the last volume containing data for the list of volumes within which a data set occupies. Another field, such as the DS1LSTAR, for example, may be used by the storage controller to compute a boundary address which identifies where in the list of extents occupied by the data set, that actual data stops and the empty space begins.

As explained in greater detail below, this metadata may be utilized by the storage controller to determine which extents and which tracks of the extents occupied by a data set actually contain client data or metadata. Accordingly, in one aspect of the present description, the storage controller can limit the tracks copied in response to a volume level copy command for example, to just those tracks which actually contain client data or metadata instead of copying all the tracks allocated to the data set whether or not the data set actually contains client data or metadata.

For VSAM data sets, it is noted that the VTOC also contains the location of a data set, the VVDS (Virtual Storage Access Method (VSAM) Volume Data Set) for each volume. In some embodiments, the VVDS is made up of VSAM Volume Records (VVRs) in which there is a VVR for each VSAM data set of the volume. The VVR for a data set contains a Data set Information Cell which in turn defines a High Used Relative Byte Address (HURBA). The storage controller may use the HURBA to determine a boundary address which is the address of the particular track of the tracks allocated to the data set, at which the data-containing tracks of the data set end, and the empty data tracks of the data set begin. Here too, in one aspect of the present description, the storage controller can limit the tracks copied in response to a volume level copy command for example, to just those tracks which actually contain client data or metadata instead of copying all the tracks allocated to the data set whether or not the track actually contains client data or metadata.

As set forth above, the volume table 200 may include metadata 204 identifying free space of the storage unit which has not yet been allocated to a data set. Thus, a VTOC may include, for example a map, such as the VTOC Pack Space Map (VPSM), for example, which maps free areas of storage that have not been allocated to a data set. The storage controller may be configured to read the free space map of the VTOC for purposes of data unit classification.

It is appreciated that the metadata describing various aspects of the data set of the record $300_i$ may include other fields, either in addition to or instead of those depicted in this example, depending upon the particular application. The data unit location information 304 may be expressed as disk, cylinder, head and record location (CCHHR), or other formats, either virtual or physical. Terms such as tracks, data units, blocks, storage allocation units, etc., may be used interchangeably to refer to a unit of data managed in the storage volume 104. The storage volume table 200 may be located at track 0 and cylinder 0 of the storage volume 104. Alternatively, the storage volume table 200 may be located at a different track and cylinder number than the first one.

Figure 4:
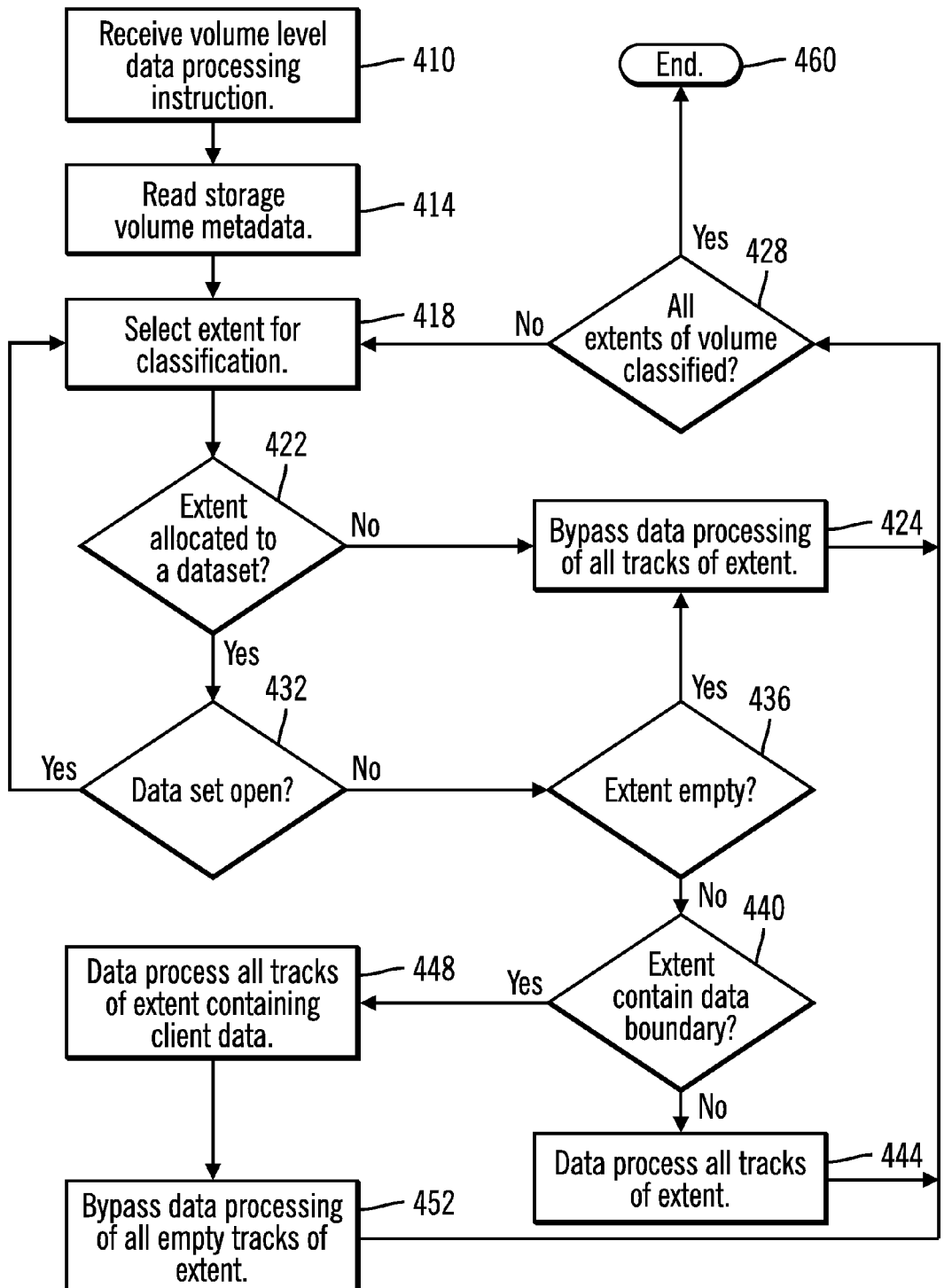
FIG. 4 illustrates an embodiment of operations of a storage controller employing data unit classification in accordance with the present description.

FIG. 4 illustrates an embodiment of operations performed by a data unit classification logic such as a data unit classification control logic 112, 112a, 112b, 120 (FIGS. 1A, 1B) in accordance with the present description, in which individual data units of a storage unit such as a storage volume may be separately classified as allocated or unallocated, and empty or data containing, and data processed accordingly in which unallocated and empty data units are bypassed instead of being data processed. In one operation, the storage controller may receive (block 410) a command or instruction to perform a data processing task. In one embodiment, the command may be to perform a data processing task at a storage volume level such as copying the data of an entire volume.

In accordance with the present description, the storage controller in performing the volume copying command, can bypass data units of the volume, which do not contain client data or metadata and instead restrict the copying operations to those data units which actually do contain client data or metadata. As a result, the volume level copying operation may in some embodiments, be performed more quickly and more efficiently in some applications. Although described in connection with a volume level data processing command in the embodiment of FIG. 4, it is appreciated that data unit classification in accordance with the present description is applicable to other levels of commands such as levels larger than a storage volume or smaller than a storage volume, for example. It is further appreciated that data unit classification in accordance with the present description may be applied to other types of data processing such as moving, migrating, mirroring, synchronizing or resynchronizing data of one storage unit with respect to another storage unit of the storage system. Also, the data processing command received (block 410) by the storage controller may be received from an external source such as a host, or may be internally generated by the storage management system of the storage controller, for example.

In response to the receipt (block 410) of the volume level data processing command, the storage controller reads (block 414) metadata describing the data stored in the storage volume which is the subject of the received data processing command. As previously mentioned, in the illustrated embodiment, each storage volume 104 (FIG. 1A) includes metadata concerning the data sets 102 which are contained either wholly or partially, within the particular storage volume 104. The metadata is stored in one or more storage unit data structures of each storage volume 104, such as a storage volume table 200.

In the illustrated embodiment, the storage unit data structure has metadata describing the storage volume 104 to which it pertains, including metadata identifying which extents of the storage volume remain unallocated, the locations of the extents allocated to each data set of the volume and the open/closed status of each data set 102 having data stored in the particular storage volume 104 of the command. Accordingly, based upon the read metadata for the selected storage volume, a data unit of the storage volume, such as a storage extent may be selected (block 418) by the data unit classification control logic of the storage controller for classification to determine (block 422) if the selected data unit should be classified as allocated to a data set or as unallocated, that is, not allocated to any data set. As previously mentioned, the storage volume table $200_i$ (FIG. 4) of each storage volume 104 includes one or more free space records 204 identifying ranges of available tracks in the storage volume $200_i$ which have not yet been allocated to a data set including data sets for client data and data sets for metadata. Thus, the tracks identified by the free space records 204 which have not yet been allocated to a data set may be classified as unallocated. Conversely, if the selected extent is not within the free space tracks identified by the free space records 204, the selected extent may be classified (block 422) as allocated to a data set.

Figures 5, 6A, 6B:
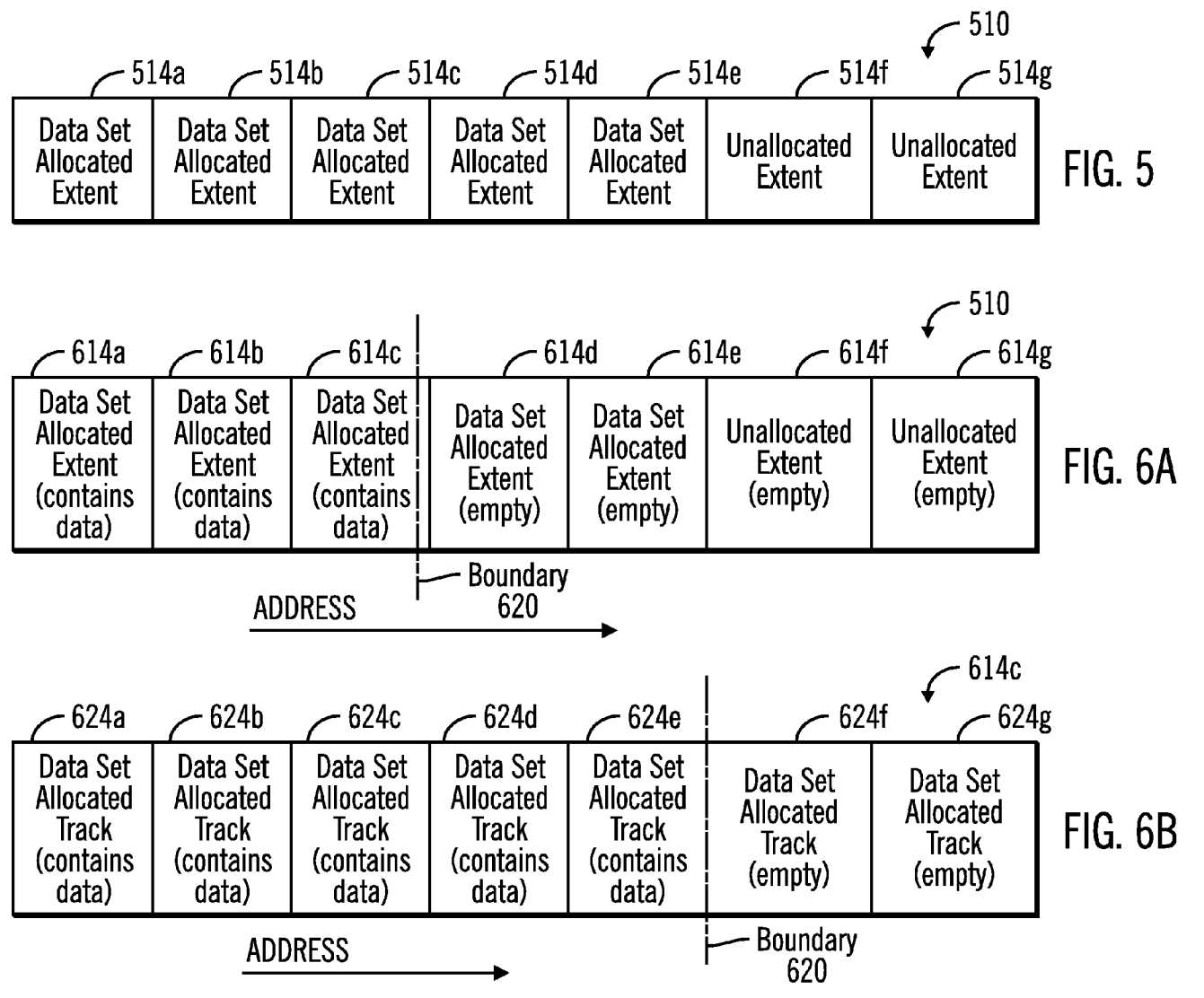

In another embodiment, the metadata for a storage volume may include a map 510 (FIG. 5) such as a VTOC Pack Space Map (VPSM), for example, in which a map element for each data unit such as an extent, for example, indicates whether or not the associated extent has been allocated to a data set. Thus, the map 510 depicts for example, a set of map elements 514a, 514b . . . 514g, each representing a data extent. In the example of FIG. 5, the map elements 514a-514e indicate that the associated data extents represented by the map elements 514a-514e have each been assigned to a data set and thus each has been allocated to a data set. Conversely, in the example of FIG. 5, the map elements 514f-514g indicate that the associated data extents represented by the map elements 514f-514g have each not been assigned to a data set and thus the associated data extents represented by the map elements 514f-514g remain unallocated. Accordingly, in one embodiment, a metadata map such as the map 510 of data units such as data extents or data tracks may be read from the metadata of the storage volume by the storage controller to determine if a particular data unit such as an extent has been allocated to a data set. It is appreciated that the manner of determining whether a data unit of a storage unit has been allocated to a data set or remains unallocated may vary, depending upon the particular application.

Extents which are classified (block 422) as unallocated to any data set may be bypassed (block 424) by the data processing operation of the received instruction (block 410), since extents not allocated to any data set do not contain client data or metadata in the illustrated embodiment. It is appreciated that the criteria for classifying data units as suitable candidates for being bypassed by the volume level data processing instruction may vary, depending upon the particular application. Further, although described in connection with extents, it is appreciated that the classification operation of block 422 and the bypass operation of block 424 may be applied at a different level data unit such as a track, allocation unit, cylinder, etc.

If it is determined (block 422) based upon the metadata read by the storage controller, that the selected extent should be classified by the storage controller as allocated to a data set, a further determination is made (block 432) based upon the metadata read by the storage controller, as to whether the data set to which the selected extent has been allocated is to be classified by the storage controller as having an open or closed status.

In one embodiment, the open/closed status metadata may be used by the data unit classification control logic of the storage controller to classify the status of each data set as either open for input/output operations, or closed for input/output operations. Because the data contained with a data set which is open for input/output operations may be modified as a result of an ongoing input/output operation, in one embodiment, the open/closed status of a data set may be used to defer the data processing requested by the received (block 410) command, for an open data set until the data set is closed for input/output operations, for example. Thus, in one embodiment, the volume level processing of an extent of a data set open for input/output operations may be deferred by selecting (block 418) another extent for classification. By the time the extents of the data set which was open are subsequently reselected (block 418) for reclassification, the data set may have closed (block 432). It is appreciated that the criteria for classifying data units as suitable candidates for deferring the volume level data processing instruction may vary, depending upon the particular application. It is further appreciated that the manner of deferring volume level data processing of a data unit allocated to an open data set may vary, depending upon the particular application.

In one embodiment, a determination (block 432) as to whether the status of the data set to which the selected extent has been allocated is either open or closed, may be made by the data unit classification control logic of the storage controller examining one or more metadata fields 310 (FIG. 3) of a data set record of a Volume Table (FIG. 2) of the particular data set to which the selected extent has been allocated. As previously mentioned, the metadata fields 310 indicate whether the data set of the record 300$_i$ is currently open for access by input/output operations, or is currently closed for input/output operations. It is appreciated that the manner of determining whether the data set to which the selected extent has been allocated is currently open or closed for input/output operations, may vary, depending upon the particular application.

If it is determined (block 432) based upon the metadata read by the storage controller, that the selected extent has been allocated to a data set which is currently closed for input/output operations, the selected extent may be further classified (block 436) based upon the metadata read by the storage controller as to whether the selected extent is empty, that is, does not contain client data or metadata. Extents which are classified (block 436) as empty may be bypassed (block 424) by the data processing operation of the received instruction (block 410), since the empty extents do not contain client data or metadata notwithstanding that the empty extent has been determined to be allocated to a data set in the illustrated embodiment. It is appreciated that the criteria for classifying data units as suitable candidates for being bypassed by the volume level data processing instruction may vary, depending upon the particular application. Further, although described in connection with extents, it is appreciated that the classification operation of block 436 and the bypass operation of block 424 may be applied at a different level data unit such as a track, allocation unit, cylinder, etc.

In one embodiment, a determination (block 436) as to whether the selected extent is empty, that is, does not contain client data or metadata, may be made by the data unit classification control logic of the storage controller examining one or more metadata fields 304, 306 (FIG. 3) of a data set record of a Volume Table (FIG. 2) of the particular data set to which the selected extent has been allocated. As previously mentioned, the metadata fields 304 identify the locations of data units such as tracks, extents or storage allocation units, for example, which have been allocated to the data set of the record 300. In addition, the fields 306 identify the location of a boundary in the form of a data boundary address of the data unit which borders between data units of the data set containing client data or metadata, and data units of the data set which are empty.

For example, FIG. 6a depicts a plurality of contiguous data extents 614a, 614b . . . 614g of the storage volume which is the subject of the received (block 410, FIG. 4) instruction. The field 304 (FIG. 3) of the record 300$_i$ for the data set of the extent selected (block 422, FIG. 4) for classification, may indicate that the extents allocated to the particular data set includes extents 614a-614e but not extents 614f, 614g which have not been allocated to a data set. In addition, the fields 306 identify the location of a boundary 620 in the form of a data boundary address of the data unit which borders between data units of the data set containing client data or metadata, and data units of the data set which are empty. As shown in FIG. 6a, the boundary between the data units containing client data or metadata and the data units which are empty is a data unit within the extent 614c in the example of FIG. 6a.

Thus, if the extent selected (block 422, FIG. 4) for classification is one of the extents 614d or 614e, for example, the storage controller by examining the metadata fields 304, 306 (FIG. 3) of a data set record of a Volume Table (FIG. 2) of the particular data set to which the selected extent has been allocated, can determine that the address of the extent 614d or 614e selected for classification is beyond the address of the extent 614c containing the data boundary 620. If so, the extent 614d or 614e may be determined to be empty, that is, not containing client data or metadata, notwithstanding that the extent 614d or 614e was classified as allocated to a data set. Accordingly, data processing of the data set-allocated, empty extent 614d or 614e may be bypassed (block 424) as discussed above, since the data set-allocated, but empty extent 614d or 614e does not contain client data or metadata.

Conversely, if it is determined that the address of the extent selected for classification is at or below (that is, to the left of in FIG. 6a) the address of the extent 614c containing the data boundary 620, the extent may be determined (block 436, FIG. 4) to not be empty, that is, determined to contain client data or metadata. Accordingly, if the selected extent is determined (block 436, FIG. 4) to contain client data or metadata, another determination (block 440) is made as to whether the selected extent contains the data boundary 620 marking the end of the data set-allocated data units which contain client data or metadata. If an extent selected for classification is determined (block 436) to contain client data or metadata but does not contain the data boundary 620), all data units of the selected extent may be data processed (block 448) in accordance with the received (block 410) instruction since all data units of the selected extent contain client data or metadata.

For example, if the extent selected (block 422, FIG. 4) for classification is one of the extents 614a or 614b (FIG. 6b), for example, the storage controller by examining the metadata fields 304, 306 (FIG. 3) of a data set record of a Volume Table (FIG. 2) of the particular data set to which the selected extent has been allocated, can determine that the address of the extent 614a or 614b selected for classification is below the address of the extent 614c containing the data boundary 620. If so, the extent 614a or 614b selected (block 422, FIG. 4) for classification may be determined to contain client data or metadata but not contain the data boundary 620. Consequently, it may be determined that all the data units of the selected extent 614a or 614b contain data. Accordingly, data processing is performed (block 444) for all tracks of the extents 614a or 614b containing client data or metadata but not containing the data boundary 629.

In another example, if the selected extent is determined (block 436, FIG. 4) to contain client data or metadata, and if it is determined (block 440) that the selected extent contains the data boundary 620 marking the end of the data set-allocated data units which contain client data or metadata, all tracks of the selected extent containing client data or metadata are processed (block 448) in accordance with the received (block 410) instruction. Conversely, all empty tracks of the selected extent lacking client data or metadata are bypassed (block 452) and thus not processed in accordance with the received (block 410) instruction.

In the example of FIG. 6a, the extent 614c has been allocated to a data set and also contains the boundary 620 between data units which contain client data or metadata and those which do not. FIG. 6b depicts a portion of the extent 614c as represented by a plurality of contiguous data track 624a, 624b . . . 624g of the extent 614c of the data set to which the extent 614c selected (block 422, FIG. 4) for classification has been allocated. In the example of FIG. 6b, the boundary 620 is defined by the address of the data unit or track 624e which may be stored in a field 306 of a data set record of a Volume Table (FIG. 2) of the particular data set to which the selected extent 614c has been allocated. Accordingly, the data units or tracks 624a-624e may be determined to contain client data or metadata since the addresses of the data units or tracks 624a-624e are at or below that of the address of the data unit 624e which defines the data boundary 620.

Accordingly, tracks 624a-624e of the selected extent 614c are all determined to contain client data or metadata and are all processed (block 448) in accordance with the received (block 410) instruction. Conversely, the data units or tracks 624f-624g may be determined to be empty, that is not contain client data or metadata since the addresses of the data units or tracks 624f-624g are beyond that of the address of the data unit 624e which defines the data boundary 620. Accordingly, tracks 624f-624g of the selected extent 614c are all determined to be empty and thus determined to not contain client data or metadata. As a result, the tracks 624f-624g of the selected extent 614c are therefore all bypassed (block 452) and thus not processed in accordance with the received (block 410) instruction.

A determination (block 428, FIG. 4) is made as to whether all extents of the storage volume have been classified. If so, the volume level data processing of the received (block 410) instruction has been completed (block 460). Conversely, if extents of the volume remain to be classified, another extent of the subject storage volume is selected (block 418) for classification, and the data units of the extents are either data processed in accordance with the data processing of the instruction or are bypassed, depending upon the classification of the extent or data unis of the extent as described above.

It is seen from the above, that data unit classification for selective data processing such as that of volume level commands, can increase the speed and efficiency of the execution of such volume level commands in some embodiments. It is appreciated that other aspects and advantages may be achieved by data unit classification for selective data processing in accordance with the present description, depending upon the particular application.

Although the operations of FIG. 4 are described in connection with a volume level data processing command for a storage volume, it is appreciated that data unit classification in accordance with the present description may be applied to data processing commands affecting multiple storage units or volumes or a portion of a single storage unit or volume.

For example, the data of a single data set may be dispersed over several different storage units such as storage volumes. Thus, data unit classification for selective data processing in accordance with the present description may be applied to multi-volume data sets and multi-volume level commands and instructions.

It is appreciated that some or all of data unit classification control functions in accordance with the present description as depicted in FIG. 4 may be implemented in a storage controller as represented by the data unit classification control logic 112, 112a, 112b of one or more of the storage controllers 100, 100a, 100b, or in one or more of the hosts 108 as represented by the data unit classification control logic 120 of the host 108 (FIG. 1A), or a combination thereof. In one embodiment, metadata describing a range of storage locations for a particular storage area may be read by the data unit classification control logic of the storage controller, for example, and passed to another data unit classification logic such as the data unit classification logic 120 of a host 108, for example, for further processing in accordance with the present description. In one example, the range of storage locations of a particular storage area may be defined by a CCHH range and volume (or volumes) identification. It is appreciated that the storage locations defining a particular storage area may be expressed in a variety of different types of data units, depending upon the particular application.

Figure 7:
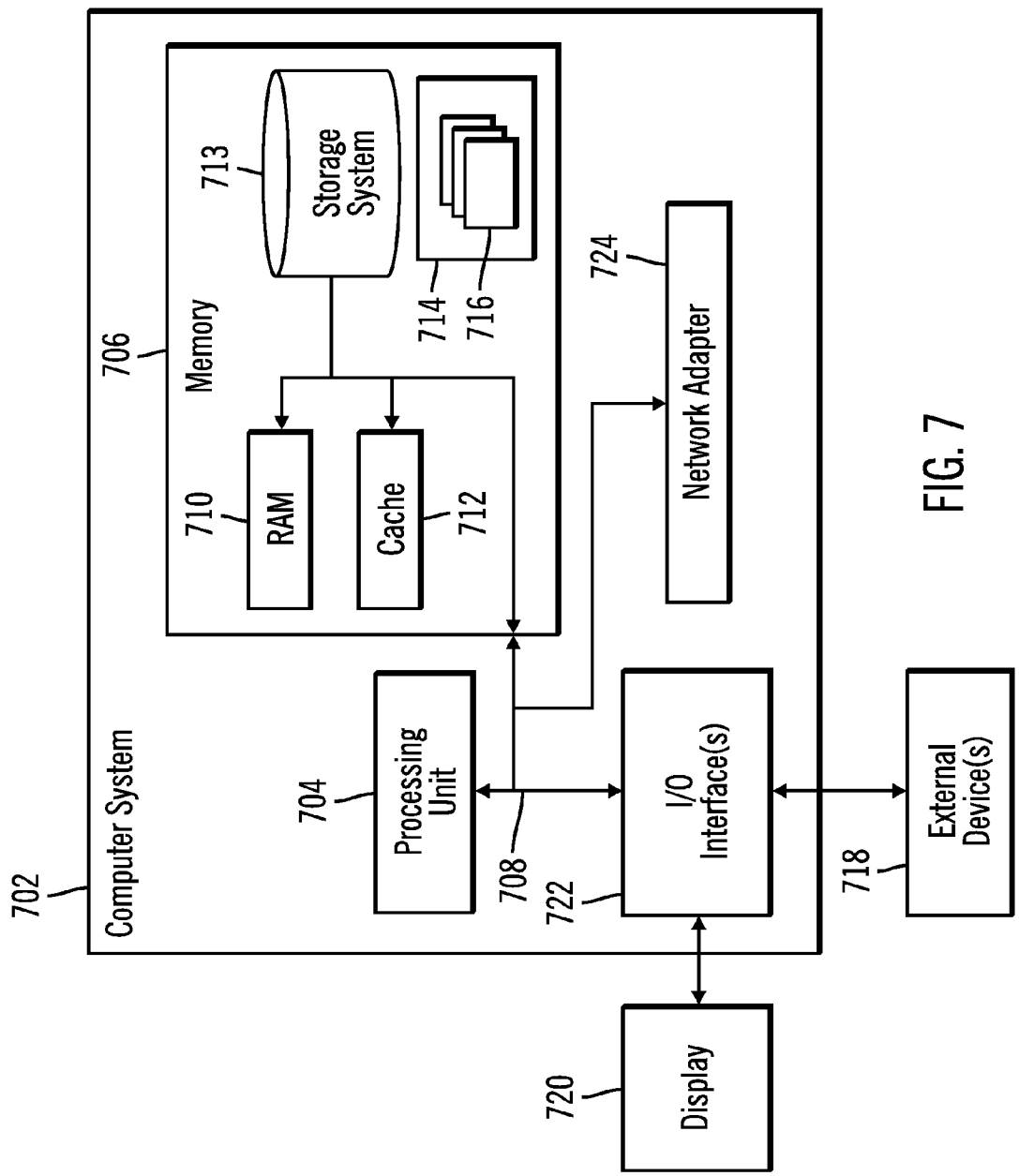
FIG. 7 illustrates a computing environment in which the components of FIGS. 1A, 1B may be implemented.

The computational components of FIGS. 1A, 1B, including the controller or storage controller 100, 100a, 100b, host 108, may each be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIGS. 1A, 1B may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising operations of a processor in a storage controller in a storage system of a computing system having a host and the storage system, the processor operations comprising:
   receiving by the storage controller of the storage system, a command to perform data processing of data stored within a first storage unit controlled by the storage controller, wherein the data processing includes at least one of copying, moving, migrating, mirroring, synchronizing and resynchronizing data of the first storage unit with respect to a second storage unit of the storage system;
   in response to the data processing command:
      reading metadata from a storage unit data structure for the first storage unit storing data in data units of the first storage unit
      based upon read metadata, classifying data units of the first storage unit as one of data set-allocated data units allocated to one or more data sets, and unallocated data units unallocated to any data set;

data processing data of at least a portion of the data units classified as data set-allocated data units of the first storage unit; and bypassing data processing of data units classified as unallocated data units of the first storage unit.

2. The method of claim 1 further comprising:

based upon read metadata, classifying data set-allocated data units as one of data containing data set-allocated data units, and empty data set-allocated data units;

data processing data contained by data containing data set-allocated data units of the storage unit; and bypassing data processing of the empty data set-allocated data units of the first storage unit.

3. The method of claim 2 wherein the storage unit is a volume of storage and the storage unit data structure storing the metadata includes a volume table of contents data structure.

4. The method of claim 3 wherein the data unit of a volume is an extent and wherein the metadata of the volume table of contents data structure includes metadata identifying data set-allocated extents of the volume, which have been allocated to a data set, and metadata identifying unallocated extents of the volume, which have not been allocated to a data set.

5. The method of claim 4 wherein the metadata of the volume table of contents data structure further includes metadata identifying a boundary between data containing data set-allocated extents of a data set of the volume, and empty data set-allocated extents of a data set of the volume, which lack data of the data set.

6. The method of claim 5 wherein the classifying data set-allocated data units as one of data containing data set-allocated data units, and empty data set-allocated data units, is a function of the metadata identifying data set-allocated extents of the volume, which have been allocated to a data set, and metadata identifying a boundary between data containing data set-allocated extents of a data set of the volume, and empty data set-allocated extents of a data set of the volume, which lack data of the data set.

7. The method of claim 3 wherein a data unit of a volume is an extent and wherein the metadata of the volume table of contents data structure includes metadata identifying data set-allocated extents of the volume, which have been allocated to a data set, and metadata identifying unallocated extents of the volume, which have not been allocated to a data set, and metadata identifying a location of a data set containing a volume record which contains a relative byte address identifying a boundary between data containing data set-allocated extents of a data set of the volume, and empty data set-allocated extents of a data set of the volume, which lack data of the data set, and wherein the classifying data set-allocated data units as one of data containing data set-allocated data units, and empty data set-allocated data units, is a function of the metadata identifying data set-allocated extents of the volume, which have been allocated to a data set, and metadata identifying the relative byte address identifying a boundary between data containing data set-allocated extents of a data set of the volume, and empty data set-allocated extents of a data set of the volume, which lack data of the data set.

8. A computer program product for providing a storage management system to manage data processing in a storage controller in a storage system of a computing system having a host and the storage system wherein the storage system includes a storage unit controlled by the storage controller, and wherein the computer program product comprises a non-transitory computer readable storage medium having program instructions embodied therewith, the program instructions executable by a processor of the storage management system to cause operations, the operations comprising:

receiving by the storage controller of the storage system, a command to perform data processing of data stored within a first storage unit controlled by the storage controller, wherein the data processing includes at least one of copying, moving, migrating, mirroring, synchronizing and resynchronizing data of the first storage unit with respect to a second storage unit of the storage system;

in response to the data processing command:

reading metadata from a storage unit data structure for the first storage unit storing data in data units of the first storage unit based upon read metadata, classifying data units of the first storage unit as one of data set-allocated data units allocated to one or more data sets, and unallocated data units unallocated to any data set;

data processing data of at least a portion of the data units classified as data set-allocated data units of the first storage unit; and bypassing data processing of data units classified as unallocated data units of the first storage unit.

9. The computer program product of claim 8 wherein the operations further comprise:

based upon read metadata, classifying data set-allocated data units as one of data containing data set-allocated data units, and empty data set-allocated data units;

data processing data contained by data containing data set-allocated data units of the storage unit; and bypassing data processing of the empty data set-allocated data units of the first storage unit.

10. The computer program product of claim 9 wherein the storage unit is a volume of storage and the storage unit data structure storing the metadata includes a volume table of contents data structure.

11. The computer program product of claim 10 wherein the data unit of a volume is an extent and wherein the metadata of the volume table of contents data structure includes metadata identifying data set-allocated extents of the volume, which have been allocated to a data set, and metadata identifying unallocated extents of the volume, which have not been allocated to a data set.

12. The computer program product of claim 11 wherein the metadata of the volume table of contents data structure further includes metadata identifying a boundary between data containing data set-allocated extents of a data set of the volume, and empty data set-allocated extents of a data set of the volume and lacking data of the data set.

13. The computer program product of claim 12 wherein the classifying data set-allocated data units as one of data containing data set-allocated data units, and empty data set-allocated data units, is a function of the metadata identifying data set-allocated extents of the volume, which have been allocated to a data set, and metadata identifying a boundary between data containing data set-allocated extents of a data set of the volume, and empty data set-allocated extents of a data set of the volume, which lack data of the data set.

14. The computer program product of claim 10 wherein a data unit of a volume is an extent and wherein the metadata of the volume table of contents data structure includes metadata identifying data set-allocated extents of the volume, which have been allocated to a data set, and metadata identifying unallocated extents of the volume, which have not been allocated to a data set, and metadata identifying a location of a data set containing a volume record which contains a relative byte address identifying a boundary between data containing data set-allocated extents of a data set of the volume, and empty data set-allocated extents of a data set of the volume, which lack data of the data set, and wherein the classifying data set-allocated data units as one of data containing data set-allocated data units, and empty data set-allocated data units, is a function of the metadata identifying data set-allocated extents of the volume, which have been allocated to a data set, and metadata identifying the relative byte address identifying a boundary between data containing data set-allocated extents of a data set of the volume, and empty data set-allocated extents of a data set of the volume, which lack data of the data set.

15. A computing system for use with a host, comprising:
a storage system having at least one storage unit for storing data in data units, the storage system further having a server having a storage controller having a storage management system configured to control the at least one storage unit and to manage data processing in the storage system and having at least one processor and a computer program product, wherein the computer program product comprises a computer readable storage medium having program instructions embodied therewith, the program instructions executable by a processor of the storage management system to cause operations, the operations comprising:
receiving by the storage controller of the storage system, a command to perform data processing of data stored within a first storage unit controlled by the storage controller, wherein the data processing includes at least one of copying, moving, migrating, mirroring, synchronizing and resynchronizing data of the first storage unit with respect to a second storage unit of the storage system;
in response to the data processing command:
reading metadata from a storage unit data structure for the first storage unit storing data in data units of the first storage unit
based upon read metadata, classifying data units of the first storage unit as one of data set-allocated data units allocated to one or more data sets, and unallocated data units unallocated to any data set;
data processing data of at least a portion of the data units classified as data set-allocated data units of the first storage unit; and
bypassing data processing of data units classified as unallocated data units of the first storage unit.

16. The computing system of claim 15 wherein the operations further comprise:
based upon read metadata, classifying data set-allocated data units as one of data containing data set-allocated data units, and empty data set-allocated data units;
data processing data contained by data containing data set-allocated data units of the storage unit; and
bypassing data processing of the empty data set-allocated data units of the first storage unit.

17. The computing system of claim 16 wherein the storage unit is a volume of storage and the storage unit data structure storing the metadata includes a volume table of contents data structure.

18. The computing system of claim 17 wherein the data unit of a volume is an extent and wherein the metadata of the volume table of contents data structure includes metadata identifying data set-allocated extents of the volume, which have been allocated to a data set, and metadata identifying unallocated extents of the volume, which have not been allocated to a data set.

19. The computing system of claim 18 wherein the metadata of the volume table of contents data structure further includes metadata identifying a boundary between data containing data set-allocated extents of a data set of the volume, and empty data set-allocated extents of a data set of the volume, which lack data of the data set.

20. The computing system of claim 19 wherein the classifying data set-allocated data units as one of data containing data set-allocated data units, and empty data set-allocated data units, is a function of the metadata identifying data set-allocated extents of the volume, which have been allocated to a data set, and metadata identifying a boundary between data containing data set-allocated extents of a data set of the volume, and empty data set-allocated extents of a data set of the volume, which lack data of the data set.

21. The computing system of claim 17 wherein a data unit of a volume is an extent and wherein the metadata of the volume table of contents data structure includes metadata identifying data set-allocated extents of the volume, which have been allocated to a data set, and metadata identifying unallocated extents of the volume, which have not been allocated to a data set, and metadata identifying a location of a data set containing a volume record which contains a relative byte address identifying a boundary between data containing data set-allocated extents of a data set of the volume, and empty data set-allocated extents of a data set of the volume, which lack data of the data set, and wherein the classifying data set-allocated data units as one of data containing data set-allocated data units, and empty data set-allocated data units, is a function of the metadata identifying data set-allocated extents of the volume, which have been allocated to a data set, and metadata identifying the relative byte address identifying a boundary between data containing data set-allocated extents of a data set of the volume, and empty data set-allocated extents of a data set of the volume, which lack data of the data set.

* * * * *